UNITED STATES PATENT OFFICE.

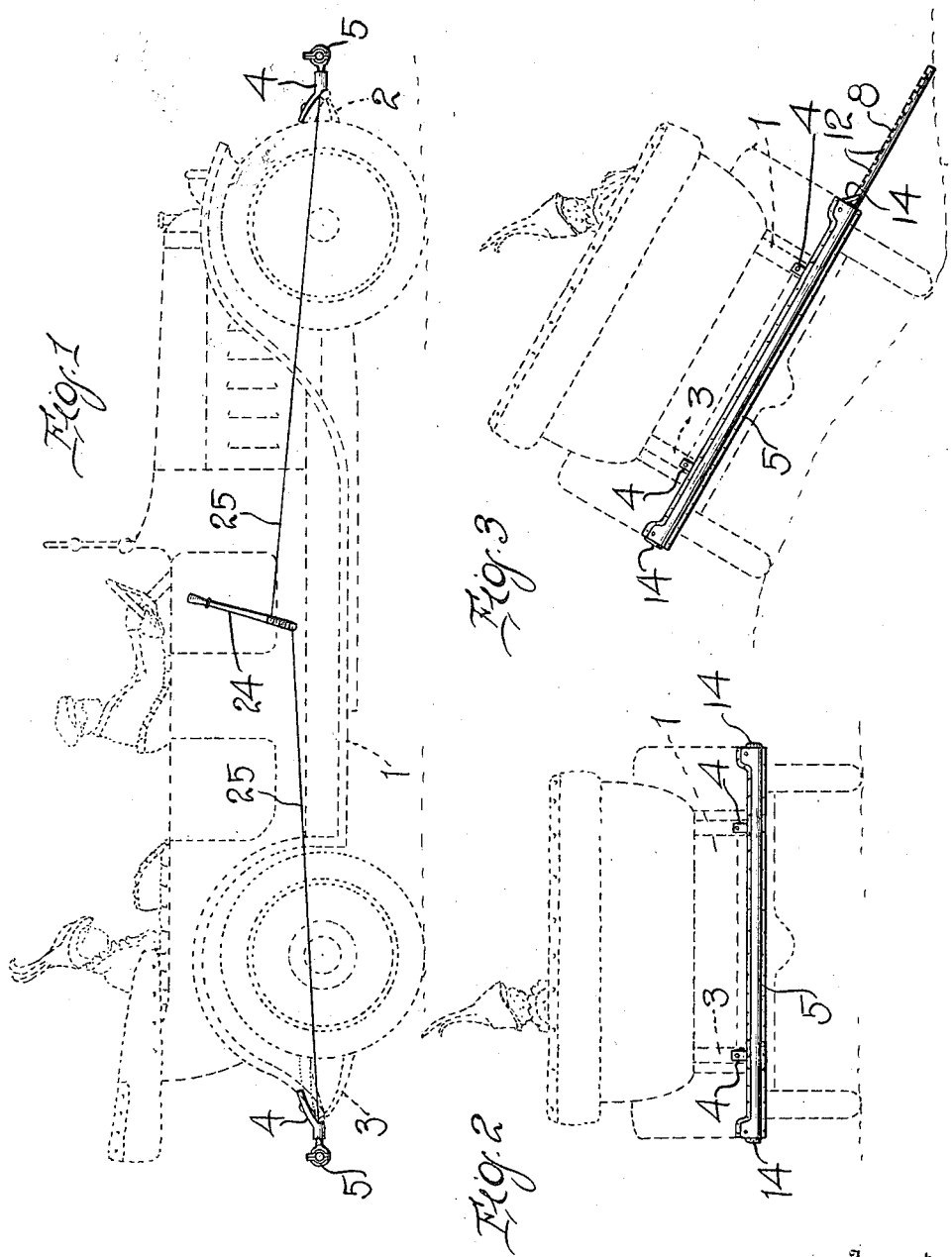

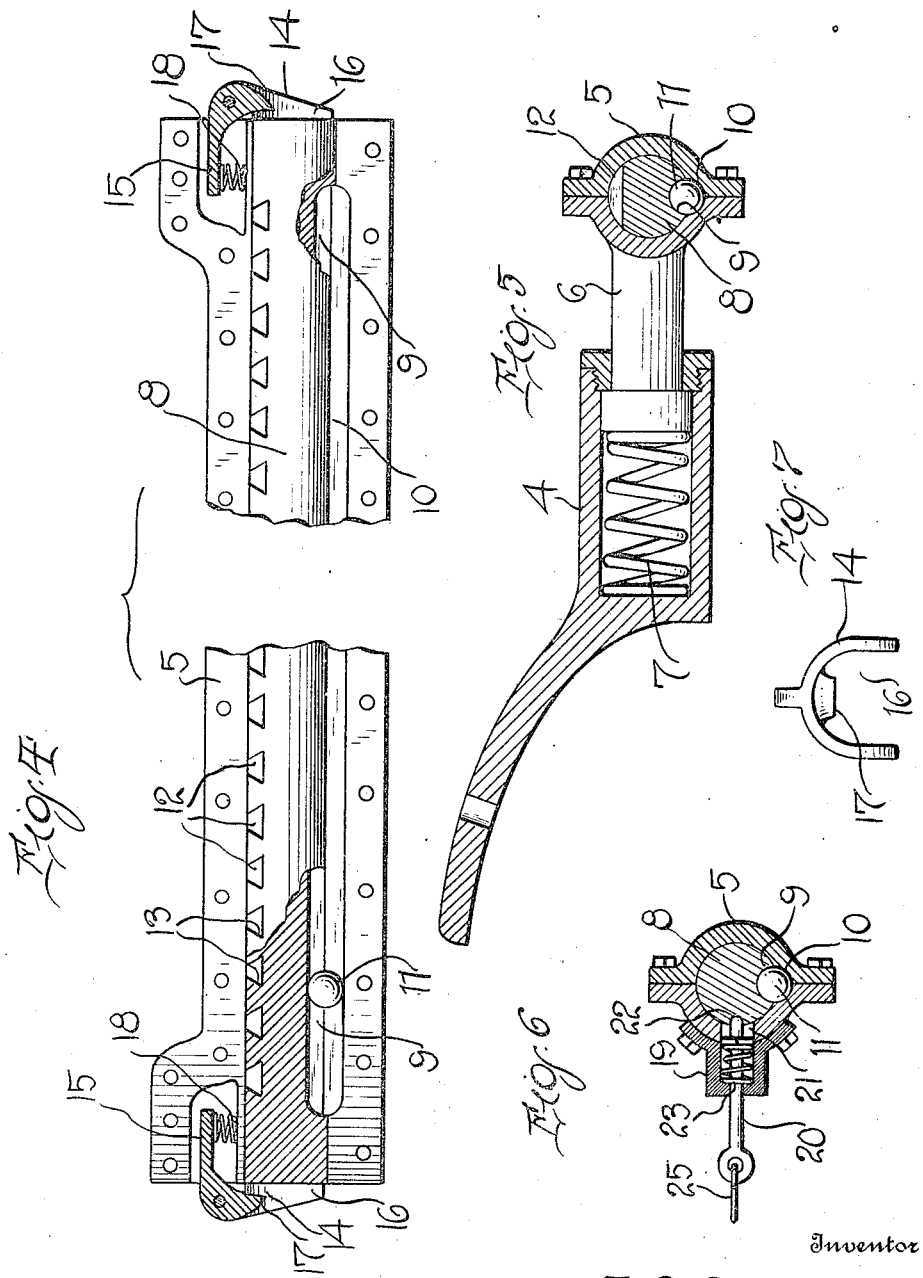

EDWARD CLIFTON SHILLING, OF COLUMBUS, OHIO, ASSIGNOR OF ONE-FOURTH TO OWEN C. FUQUA, OF COLUMBUS, OHIO, AND ONE-FOURTH TO JACOB DAGGER, OF URBANA, OHIO.

SAFETY DEVICE FOR AUTOMOBILES.

1,146,355.   Specification of Letters Patent.   Patented July 13, 1915.

Application filed September 21, 1914. Serial No. 862,859.

*To all whom it may concern:*

Be it known that I, EDWARD C. SHILLING, a citizen of the United States, residing at Columbus, in the county of Franklin and State of Ohio, have invented certain new and useful Improvements in Safety Devices for Automobiles, of which the following is a specification, reference being had to the accompanying drawings.

This invention relates to safety devices and particularly to a safety device for automobiles or similar vehicles to prevent the same from turning completely over when falling into a ditch.

An object of this invention is the provision of a safety device of this character which normally forms bumpers at the forward and rear ends of the vehicle.

A further object of this invention is the provision of a safety device which comprises tubular casings connected to the forward and rear springs of the vehicle and which provide bumpers for the same, the casings inclosing transversely slidable bars which are normally held within the casing, and which are adapted to slide out of the casings in either direction to engage the ground, the bars being automatically prevented from returning within the casing upon engaging the ground.

With these and other objects in view, my invention consists in the novel construction, combination, and arrangement of parts, to be hereinafter more fully described, claimed, and illustrated in the accompanying drawings, in which—

Figure 1 is an elevational view showing the vehicle in dotted lines having my improved safety device connected thereto; Fig. 2 is a rear elevational view showing the device in normal position; Fig. 3 is a rear elevational view showing the device in extended position; Fig. 4 is an elevational view partly in section showing one section of the casing removed; Fig. 5 is a transverse sectional view of one of the bumpers and the means for connecting the same to the vehicle; Fig. 6 is a transverse sectional view showing the means for holding the bars within the casings; and Fig. 7 is an elevational view of one of the angular levers for holding the bars in extended position.

Referring more particularly to the drawings, the numeral 1 designates the frame of an automobile or similar vehicle, and 2 and 3 the forward and rear elliptical springs respectively, to which are secured the forwardly and rearwardly extending sockets 4. A transversely disposed cylindrical casing 5 is arranged forwardly and rearwardly of the vehicle, each of the casings having inwardly extending arms 6 for slidable engagement in the sockets 4, the arms being engaged at their inner extremities against springs 7 contained within the sockets, whereby the casings constitute bumpers for the vehicle. Slidably mounted in each of the casings is a bar 8, the under side of which is provided with a longitudinal groove 9, which registers with a similar groove 10 formed in the casing, whereby a channel is provided to receive a bearing ball 11 which closely engages the walls of the grooves 9 and 10 and which prevents rotation of the shaft within the casing.

The upper face of each bar is provided with a longitudinal series of rack teeth 12, the under faces of each of the teeth being beveled as at 13, and pivotally connected to the ends of each casing are angular levers 14, one end of which extends within the casing as at 15, and the outer ends of the levers are forked as at 16 to receive the bars 8 therethrough, the levers having dogs 17 extending between the arms 16 of the forked ends thereof, the dogs being disposed in the path of the bars, so as to engage the rack teeth when the shafts move out of their casings. Arranged to bear against the ends 15 of the levers 14 are springs 18 which normally force the ends of the levers carrying the dogs 17 inwardly against the ends of the bars 8, so that when the bars move out of the casings, the levers are rotated against the tension of the springs 18 so that when the bars reach the limit of their movement, the dogs 17 will be forced into engagement with the rack teeth by the tension of the springs 18 to prevent return of the bars within the casings. Each of the casings is provided with a bracket 19 in which a pin 20 is slidably mounted, the casings having openings 21 therein through which the pins are adapted to extend to engage in recesses 22 formed in the bars 8. Each of the pins 20 is engaged by a spring 23 whereby the pins are normally forced inwardly so that the same are adapted for engagement in the recesses 22, and to simultaneously withdraw the pins from engagement with the bars when desired, a lever 24 is pivotally mounted on the frame of the vehicle at any desired point, preferably within reach of the operator, and connected to the lever on opposite sides of its pivotal point are cords 25 which are connected at their free ends to the pins 20, whereby upon movement of the lever in the proper direction both pins are withdrawn from engagement with the bars.

In the practical use of my improved device, the bars 8 are entirely inclosed within the casings by reason of the engagement of the pins 20 in the recesses 22 in the bars, whereby there are no projecting parts, and the casings serve as bumpers for the vehicle. Should the vehicle fall into a ditch, the operator actuates the lever 24 to withdraw the pins 20 from the recesses 22, thereby allowing the bars 8 to slide out of the casing by the force of gravity in the direction in which the machine is falling, until the bars engage the ground, whereupon the same are prevented from returning within the casings by the engagement of the dogs 17 with the rack teeth 12 in the upper face of the bars as shown in Fig. 3 of the drawing. By this construction it will be seen that the machine is prevented from turning entirely over and falling upon the occupants as usually happens when a machine runs into a ditch, and when the automobile is again moved to its normal position, the bars 8 may be readily returned within the casings by grasping the arms 14 of the levers to raise the dogs 17 from engagement with the rack teeth. The outward movement of the bars 8 in either direction is limited, as the grooves 9 in the bars and the grooves 10 in the casings terminate short of the ends of the bars and casings, so that the balls engaging the end walls of the grooves 9 and 11 prevent the bars from moving entirely out of the casings, the balls 11 also serving to prevent rotation of the bars within the casings.

It will be seen from the drawings that my improved safety device is not unsightly in appearance, as the casings are in the usual position of the ordinary bumpers for automobiles, and while serving as a safety device to prevent the turning over of an automobile, the casings also serve as bumpers to relieve the vehicle of undue shocks in case of collision.

Having thus fully described my invention, what I desire to claim and secure by Letters Patent is:—

1. A safety device for vehicles comprising sockets carried by the forward and rear ends of the vehicle, spring pressed casings connected to said sockets, slidable bars mounted in said casings, each of said bars having a longitudinal series of rack teeth formed on one face thereof, and means carried by the casing for engagement with the rack teeth to hold the bars in extended position after the same have moved partially out of the casings upon tilting of the machine in either direction.

2. A safety device for vehicles including longitudinal, yieldable supporting members attached to the end of the vehicle, a casing carried by the members, and a pair of bars slidable in the casing, said bars being adapted to terminally engage the ground upon the tilting of the machine in either direction.

3. A safety device for vehicles including longitudinally, yieldable supporting members attached to the end of the vehicle, a casing carried by the members, a pair of bars slidable in the casing, said bars being adapted to terminally engage the ground upon the tilting of the machine in either direction, and means normally maintaining the bars within the casing and against sliding movement therein, and means operable from within the vehicle for releasing said first means.

4. A safety device for vehicles including a casing disposed transversely with respect to the vehicle, longitudinally yieldable means supporting the casing, whereby the casing may act as a buffer in case the end of the vehicle collides with an obstacle, and a pair of bars slidable longitudinally through the casing and transversely with respect to the vehicle, said bars being adapted to terminally engage the ground upon the tilting of the vehicle in either direction.

5. A safety device for vehicles including a pair of sockets extending longitudinally from the end of the vehicle, an arm slidable in each socket and longitudinally with respect to the vehicle, yieldable means arranged within the sockets for normally holding the arms in extended position, a casing disposed transversely with respect to the vehicle and supported by the outer ends of said arm, said casing being adapted to act as a yieldable buffer upon the colliding of the vehicle with an obstacle, a pair of bar members slidably mounted in the casing for transverse movement with respect to the vehicle, means normally holding the bars against movement, and means operable from within the vehicle for releasing said means whereby the bars may slide outwardly into engagement with the ground upon the tilting of the vehicle in either direction.

In testimony whereof I hereunto affix my signature in the presence of two witnesses.

EDWARD CLIFTON SHILLING.

Witnesses:
 ORANGE SELLS,
 J. A. GODOWN.